US008564540B2

(12) United States Patent
Roka

(10) Patent No.: US 8,564,540 B2
(45) Date of Patent: Oct. 22, 2013

(54) SPLIT KEYBOARD AND HANDLES FOR MOBILE DEVICES

(75) Inventor: Pujan K. Roka, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 303 days.

(21) Appl. No.: 12/858,243

(22) Filed: Aug. 17, 2010

(65) Prior Publication Data
US 2012/0044147 A1    Feb. 23, 2012

(51) Int. Cl.
*G06F 3/02* (2006.01)
(52) U.S. Cl.
USPC .......................................... 345/169; 345/168
(58) Field of Classification Search
USPC ........ 345/156–178; 455/575.1, 566; 361/610, 361/611–679.16
See application file for complete search history.

(56) References Cited

U.S. PATENT DOCUMENTS

| | | | |
|---|---|---|---|
| 5,841,635 A | 11/1998 | Sadler et al. | |
| 6,983,175 B2 * | 1/2006 | Kwon | 455/575.1 |
| 7,053,884 B2 * | 5/2006 | Huang et al. | 345/168 |
| 7,076,058 B2 | 7/2006 | Ikeuchi et al. | |
| 7,099,708 B2 | 8/2006 | Rönkkö | |
| 7,187,363 B2 | 3/2007 | Nguyen et al. | |
| 7,221,560 B2 | 5/2007 | Varela | |
| 7,269,450 B2 | 9/2007 | Lee et al. | |
| 7,283,847 B2 | 10/2007 | Kim | |
| 7,489,301 B2 | 2/2009 | Chen et al. | |
| D597,091 S * | 7/2009 | Varela | D14/346 |
| 7,636,592 B2 | 12/2009 | Kim et al. | |
| 7,846,027 B2 * | 12/2010 | Meyer | 463/46 |
| 7,986,514 B2 * | 7/2011 | Wang et al. | 361/679.02 |
| 2002/0006815 A1 | 1/2002 | Finke-Anlauff | |
| 2005/0054393 A1 | 3/2005 | Fagerstrom et al. | |
| 2005/0104855 A1 * | 5/2005 | Grossmeyer | 345/169 |
| 2005/0153728 A1 | 7/2005 | Rönkkö | |
| 2005/0168446 A1 * | 8/2005 | Majdoub | 345/168 |
| 2006/0056141 A1 | 3/2006 | Pihlaja et al. | |
| 2006/0270445 A1 | 11/2006 | Miramontes | |
| 2007/0037618 A1 | 2/2007 | Lee | |
| 2007/0146330 A1 * | 6/2007 | Nguyen et al. | 345/169 |
| 2007/0268247 A1 * | 11/2007 | Quatro | 345/156 |

(Continued)

FOREIGN PATENT DOCUMENTS

| | | |
|---|---|---|
| CN | 1327336 | 12/2001 |
| KR | 20040018169 | 3/2004 |
| WO | 2004019596 | 3/2004 |

OTHER PUBLICATIONS

Slash Gear. Web. Aug. 17, 2010. <http://www.slashgear.com/nokia-c2-split-keyboard-phone-leaks-2883418/>.

(Continued)

*Primary Examiner* — Kent Chang
*Assistant Examiner* — Nelson Rosario
(74) *Attorney, Agent, or Firm* — Sutherland Asbill & Brennan LLP

(57) ABSTRACT

Embodiments of the invention include split keyboard and handles adaptable for use with mobile devices. According to one embodiment, a mobile device is provided that includes a body, which houses a display, and a split keyboard configured as a first keypad half and a second keypad half. The first keypad half and the second keypad half are configured to separately extend and retract from the body. In addition, each keypad half may include a retractable handle.

16 Claims, 6 Drawing Sheets

(56) References Cited

U.S. PATENT DOCUMENTS

| | | |
|---|---|---|
| 2009/0128368 A1 | 5/2009 | Chen et al. |
| 2009/0170566 A1 | 7/2009 | Kwon et al. |
| 2009/0186650 A1* | 7/2009 | Kwak et al. ............... 455/550.1 |
| 2009/0215495 A1* | 8/2009 | Fahlgren et al. ............ 455/566 |
| 2010/0079938 A1 | 4/2010 | Paschke et al. |
| 2010/0085308 A1* | 4/2010 | Jarczyk ........................ 345/168 |
| 2011/0199307 A1* | 8/2011 | Dinh et al. ................... 345/168 |

OTHER PUBLICATIONS

Slash Gear. Web. Aug. 17, 2010. <http://www.slashgear.com/unboxing-the-nokia-e70-smartphone-08842/>.

Electronista. Web. Aug. 17, 2010. <http://www.electronista.com/articles/10/01/25/motosplit.would.have.new.kb.1ghz.chip/>.

* cited by examiner

SPLIT KEYBOARD AND HANDLES FOR MOBILE DEVICES

FIELD OF THE INVENTION

Aspects of the invention relate generally to mobile devices, and more particularly, to split keyboards and associated handles for mobile devices.

BACKGROUND OF THE INVENTION

Mobile device use is rapidly increasing. Substantial improvement efforts focus on increasing the display size and improving the keyboard and other input features. Recently, touch screen displays have gained in popularity, allowing mobile device users to provide input directly via a touch screen in lieu of a keyboard. As an attempted improvement to touch screen only devices, some mobile devices include both a keyboard and a touch screen, allowing the user to select either keyboard input or touch screen input. One conflicting factor in mobile device design is the overarching goal to decrease the total physical size of the mobile devices while providing increased display size and user-friendly keyboards.

Accordingly, there exists a need for improved mobile devices, including improved keyboard design.

BRIEF DESCRIPTION OF THE INVENTION

Some or all of the above needs and/or problems may be addressed by certain embodiments of the invention. According to one embodiment, a mobile device is provided that includes a body, which houses a display, and a split keyboard configured as a first keypad half and a second keypad half. The first keypad half and the second keypad half are configured to separately extend and retract from the body. In addition, each keypad half may include a retractable handle.

According to another embodiment, a mobile device is provided that includes a body housing a display and a first retractable handle and a second retractable handle. The first retractable handle and the second retractable handle are operable to selectively extend from approximately opposite sides of the body.

According to yet another embodiment, an input assembly for a mobile device is provided. The input assembly may include a first keypad half having a first retractable handle selectively extendable from the first keypad half and a second keypad half having a second retractable handle selectively extendable from the second keypad half. The first keypad half and the second keypad half are adapted for attaching to a mobile device body and for selective extension and retraction from approximately opposite sides of the mobile device body.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments described herein include apparatus adapted to provide a split keyboard with each keypad half having extendable and retractable handles for use with a mobile device. According to one embodiment, the split keyboard includes a first keypad half and a second keypad half, each adapted for extending from the sides (or any other suitable surface) of a body that houses the mobile device display. Accordingly, by providing a split keyboard, the keys of each respective keypad half can have larger keys to improve operation and ease of use, while still maintaining a reduced, slim, compact profile when not in use. Moreover, by including extendable and retractable handles from each of the keypad halves, or from another portion of the mobile device, an even greater surface area is provided so that a user can grasp the mobile device more comfortably and securely. Like the keypad halves, the handles are adapted for retracting against or within the respective keypad half (or other mobile device portion), maintaining a reduced profile when not in use. According to various embodiments, a variety of extension and retraction apparatus may be utilized to allow selective movement of the keypad halves with respect to the body, and the handles with respect to the keypad halves and body, as described in more detail with reference to FIGS. 1-14.

Figure 1:
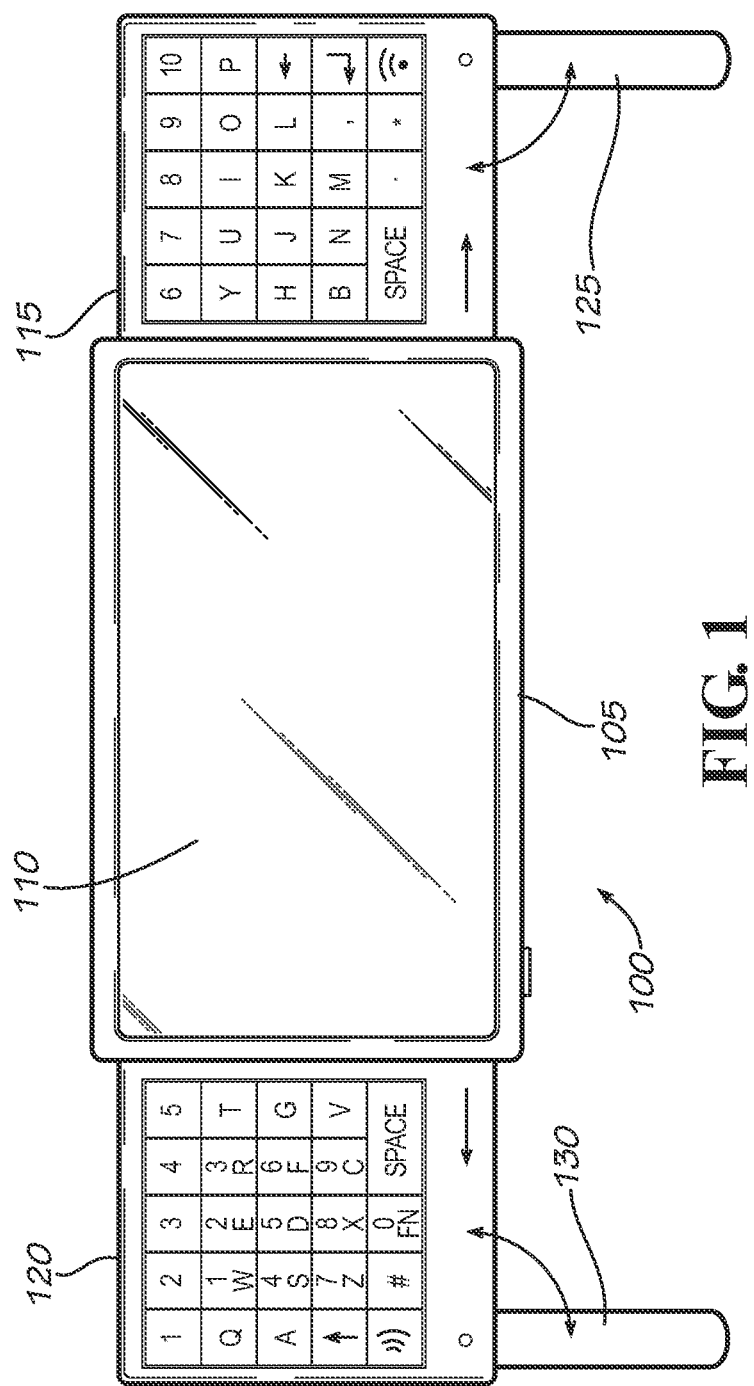
FIG. 1 is a front view of a mobile device having a split keyboard and retractable handles, according to an example embodiment.

An example mobile device 100 embodiment will now be described illustratively with respect to FIG. 1. According to various embodiments, a mobile device may be, but is not limited to, (a) a mobile telephone; (b) a personal digital assistant; (c) a personal computer; (d) a smart phone; (e) a mobile email device; or (f) a mobile digital media device. It is appreciated that these device types are provided for illustrative purposes and are not limiting. The mobile device 100 includes a body 105 that houses a display 110. According to one embodiment, a first keypad half 115 and a second keypad half 120 extend in approximately opposite directions from the body 105. A first handle 125 is associated with the first keypad half 115 and is operable for selective extension and retraction from the first keypad half 115. A second handle 130 may be similarly associated with the second keypad half 120.

According to one embodiment, the display 110 may be a touch screen display where all or at least a portion of the display 110 is operable for receiving input from a user based on tactile interaction with the display 110. Accordingly, providing the first keypad half 115 and the second keypad half 120 allows a second input option that utilizes a more traditional keypad. It is appreciated, however, that, according to other embodiments, the display 110 may only partially occupy the front surface of the body 105, the display 110 may or may not be a touch screen display, and the body 105 may include an additional keypad. For example, in one embodiment, the body 105 may house in a fixed position a numerical keypad of the type typically included with mobile telephones (e.g., having numbers 0-9, *, #, and optionally other input keys). In another embodiment, the body 105 may house in a fixed position a mobile QWERTY keypad of the type included in personal digital assistants or mobile email devices.

According to one embodiment, each of the keypad halves 115, 120 are adapted to selectively extend and retract from the body 105 of the mobile device 100. In one embodiment, the keypad halves 115, 120 together contain most, if not all, of the keys typically provided by a mobile QWERTY keypad included in personal digital assistants, mobile email devices, or other mobile devices. For example, as shown in FIG. 1, the first keypad half 115, which is intended for operation by a user's right hand, may include the following keys: Y, U, I, O, P, H, J, K, L, B, N, M, as well as additional input keys, such as, but not limited to, carriage return, backspace, function keys, period, comma, space key, asterisk, and the like. Similarly, the second keypad half 120, intended for use by the user's left hand, may include the following keys: Q, W, E, R, T, A, S, D, F, G, Z, X, C, V, as well as additional input keys, such as, but not limited to, up keys, down keys, function keys, pound, space key, and the like. It is further appreciated that, in various embodiments, number keys may be provided with one or both of the first keypad half 115 or the second keypad half 120. For example, according to one embodiment, the second keypad half 120 may include numbers 1-5 while the first keypad half 115 may include numbers 6-9 and 0. In other embodiments, one of the keypad halves 115, 120 may include input keys for all of the numbers 0-9, such as separate keys from the letter keys, or combined with the letter keys. FIG. 1 illustrates the second keypad half 120 having combined letter and number keys. In other embodiments, however, number keys may be provided as separate keys from the letter keys.

Each of the keypad half embodiments described herein may further include one or more locking mechanisms operable for selectively maintaining the respective keypad half in a retracted configuration or an extended configuration. Locking mechanisms may include, but are not limited to, latches, clips, tabs, ratcheting apparatus, high and low friction points, and the like.

It is appreciated that the keypad configurations shown and described herein are provided for illustrative purposes and are not limiting.

The first handle 125 and the second handle 130 are each adapted for selective extension from and retraction to the respective keypad half 115, 120. As described herein with reference to FIGS. 6-10, the first handle 125 and the second handle 130 can be associated with the body 105 and/or the keypad halves 115, 120 in a variety of ways, including in different orientations and positions relative to other components of the mobile device 100 or different apparatus for selective extension and retraction. For example, each handle 125, 130 may be pivotably attached, slideably attached, hingedly attached, or rotatably attached to the respective keypad half 115, 120. In addition, each handle 125, 130, when in a retracted configuration, may lie in a planar or a parallel planar orientation with respect to the respective keypad half 115, 120 and/or may be contained (at least partially) within an interior space of the respective keypad half 115, 120. Any of the handle embodiments described herein may further include one or more locking mechanisms operable for selectively maintaining the retractable handle in a retracted configuration or an extended configuration. Locking mechanisms may include, but are not limited to, latches, clips, tabs, ratcheting apparatus, high and low friction points, and the like. FIGS. 6-10 illustrate additional example handle orientation and extension/retraction apparatus, according to various example embodiments.

Figure 2:
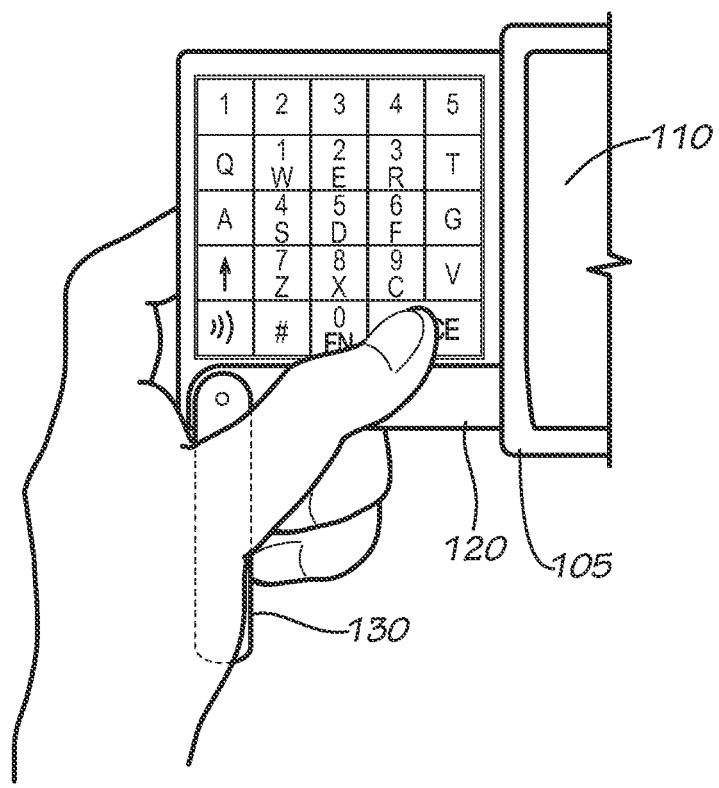
FIG. 2 is a partial perspective view of a mobile device shown in use, according to an example embodiment.

FIG. 2 illustrates a user holding a mobile device 100 with extendable keypad halves and handles, according to one embodiment. As shown by FIG. 2, an operator can beneficially grasp both the extendable handle 130 (left side shown by example) and the second keypad half 120 with the left hand. Thus, the extendable handle 130 provides an additional surface area to grasp the mobile device 100 more comfortably and securely, while still allowing easy operation of the input keys of the respective keypad half 120 (such as with the user's left thumb, as shown).

Figure 3:
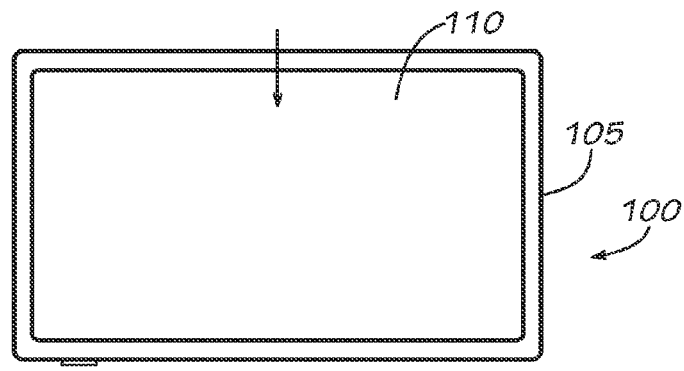
FIG. 3 is a front view of a mobile device shown without keypad halves or handles extended, according to an example embodiment.
Figure 4:
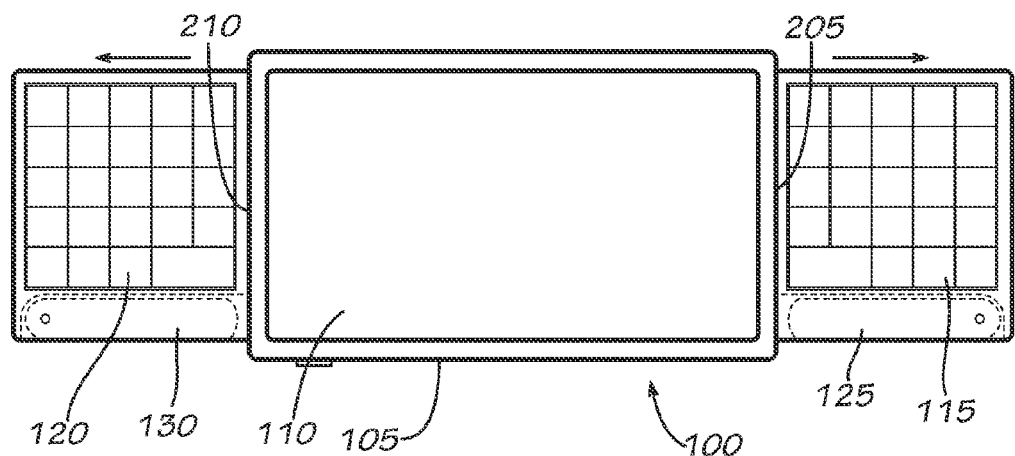
FIG. 4 is a front view of a mobile device shown with keypad halves extended, according to an example embodiment.
Figure 5:
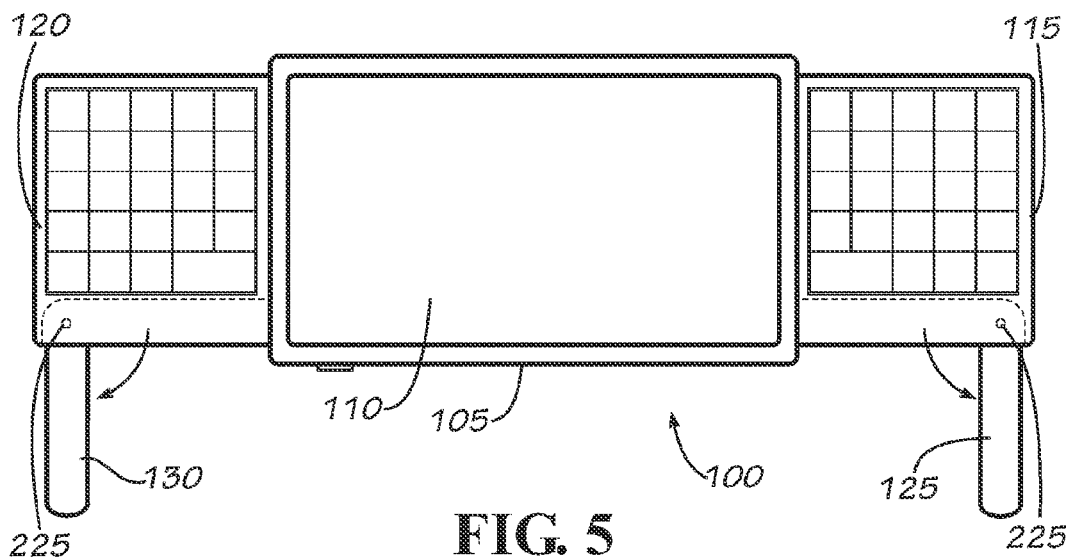
FIG. 5 is a front view of a mobile device shown with keypad halves and handles extended, according to an example embodiment.

FIGS. 3-5 illustrate an example mobile device 100 having first and second keypad halves 115, 120 and extendable handles 125, 130 in various stages of extension and retraction, according to one embodiment. FIG. 3 is a front view showing the mobile device 100 without keypad halves or handles extended from the body 105, according to an example embodiment. In this embodiment, the mobile device may be operable even with keypad halves in their retracted configuration, such as if only utilizing the display 110 (e.g., utilizing a touch screen, viewing visual content, listening to audio content, recording audio or visual content, etc.).

FIG. 4 is the same front view, shown with the keypad halves 115, 120 extended from the body. According to this embodiment, the keypad halves 115, 120 each extend in approximately opposite directions (e.g., from the right side 205 of the body 105 and from the left side 210 of the body 105), with the body 105 and the display 110 positioned between the first and second keypad halves 115, 120. According to the embodiment shown in FIG. 4, the retractable handles 125, 130 fit within a recess formed along the bottom edge of the back portion of each respective keypad half 115, 120 (also shown with reference to FIGS. 6A, 6C, and 7).

In other embodiments, however, the retractable handles 125, 130 may be positioned adjacent the bottom edges of the respective keypad half 115, 120 when in a retracted configuration, such that the keypad half does not extend as far as that illustrated in FIG. 4, allowing the retractable handles 125, 130 to occupy the space and lie along approximately the same plane as the keypad halves 115, 120. This adjacent orientation allows the handles 125, 130 to extend from and retract to the body 105 with the respective keypad half 115, 120, and to minimize the thickness of the mobile device 100. It is appreciated, however, that any other orientations and extension apparatus may be utilized, such as are described herein.

FIG. 5 is the same front view of the mobile device 100 shown with both keypad halves 115, 120 extended from the body 105 and both handles 125, 130 extended from the respective keypad half 115, 120. According to this embodiment, each handle 125, 130 is pivotably attached to the respective keypad half 115, 120 by a pivoting mechanism 225 (e.g., pin, divot, etc.). In their extended configuration, the handles 125, 130 thus extend outwardly and in a direction away from the bottom of the mobile device 100. It is appreciated that various other orientations of the handles 125, 130 with respect to the keypad halves 115, 120 may be provided. For example, instead of being located at or near the outer edge of each keypad half 115, 120, the handles 125, 130 may be configured such that, when in an extended configuration, the handles 125, 130 extend from an intermediate point along the bottom edge of the respective keypad half 115, 120.

According to one embodiment, each keypad half 115, 120 may be adapted to allow only partial extension, such that the keypad half 115, 120 does not extend completely from the body 105 of the mobile device 100. This may be beneficial in some situations, such as if only a few input keys are needed, or if the keypad halves 115, 120 are extended for the purpose of allowing extension of the handles 125, 130. For example, according to one embodiment, the keypad halves 115, 120 may be extended, the handles 125, 130 extended, and then the keypad halves 115, 120 retracted at least partially, while retaining the handles 125, 130 in an extended configuration, such as when the handles 125, 130 pivotably extend and retract. As another example, the keypad halves 115, 120 may be extended only partially to allow extending the handles 125, 130, such as when the handles 125, 130 slideably extend and retract. According to one embodiment, a locking apparatus may be included to selectively secure the keypad halves 115, 120 in their intermediate position and to provide a secure relationship of the handles 125, 130 with the mobile device body 105. It is appreciated that any of the keypad and handle embodiments described herein may be adapted for partial extension.

Figure 6A:
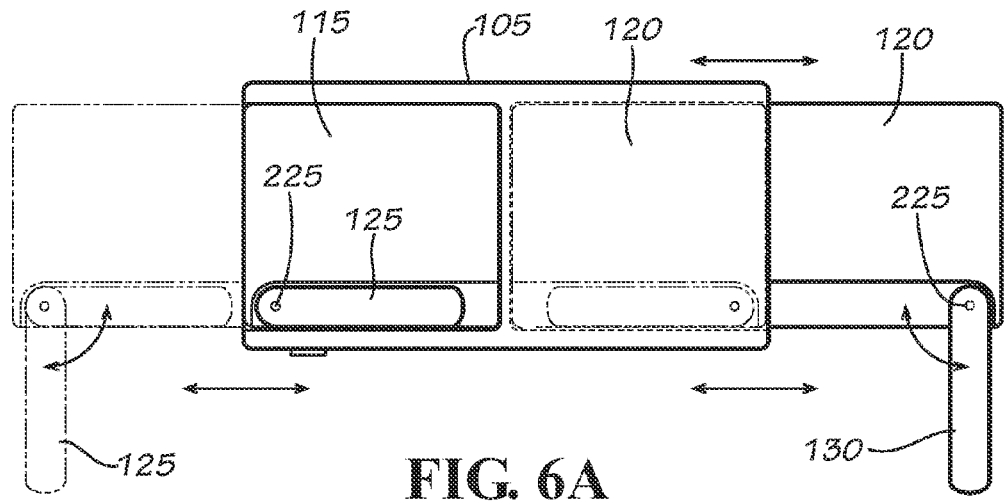
FIG. 6A is a back view of a mobile device shown with keypad halves and handles in various positions, according to an example embodiment.

FIG. 6A illustrates a back (or underneath) view of a mobile device 100 shown with keypad halves 115, 120 and handles 125, 130 in various positions relative to the body 105, according to an example embodiment. As shown, the second keypad half 120 is extended with its handle 130 extended, while the first keypad half 115 and the first handle 125 are in a retracted position, positioned against the back surface of the body 105. The broken lines indicate the second keypad half 120 and handle 130 in a retracted position and the first keypad half 115 and handle 125 in an extended position.

According to this embodiment, the keypad halves 115, 120 are associated with the body 105 in a slideable relationship, which can be accomplished by a variety of apparatus. For example, according to one embodiment, one or more tracks may be mounted or otherwise provided with the body 105 on its back side to which each keypad half 115, 120 can be slideably mounted. According to another embodiment, one or more channels, slots, or grooves may be provided with the body 105 into which each keypad half 115, 120 can be slideably inserted. In yet another embodiment, the body 105 may include one or more carriages adapted to attach to, and allow sliding movement of, each keypad half 115, 120. In yet other embodiments, the body 105 may include one or more interior portions or cavities into which each keypad half 115, 120 may be inserted.

Figure 6B:
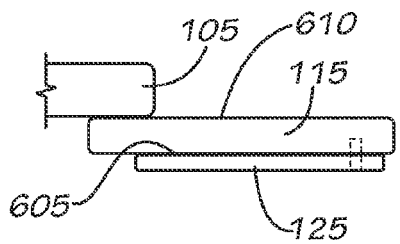
FIG. 6B is a partial side view of a keypad half and handle, according to an example embodiment.
Figure 6C:
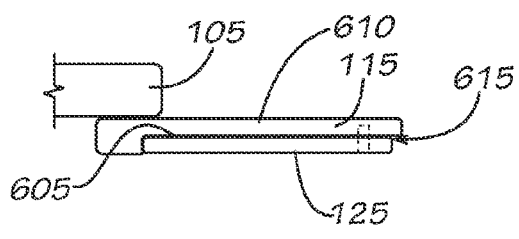
FIG. 6C is a partial side view of a keypad half and handle, according to an example embodiment.

The handles 125, 130 of this embodiment are pivotably attached to the respective keypad half 115, 120 by a pivoting mechanism 225. In a retracted position, the handles 125, 130 are positioned in a plane parallel to both the plane occupied by the respective keypad half 115, 120 and the body 105, and to lie substantially underneath the back surface of the respective keypad half 115, 120, as shown by the solid line illustrations of the first handle 125, for example. Handles 125, 130 constructed in this nature allow for maximizing the size of each keypad half 115, 120, thus increasing the size and/or number of input keys possible. FIGS. 6B and 6C illustrate side views (representing the mobile device 100 with the front surface facing up) of different configurations of the first keypad half 115 as an example of the orientation of the handle 125 with respect to the keypad half 115. For example, FIG. 6B illustrates the first handle 125 positioned against a flat back surface 605 of the first keypad half 115, the top surface 610 being the surface housing the keypad. In another example, shown in FIG. 6C, the first keypad half 115 forms a recessed area 615 on its back surface 605 for receiving the first handle 125 when in retracted configuration, to minimize the combined thickness of the keypad half 115 and the handle 125.

Figure 7:
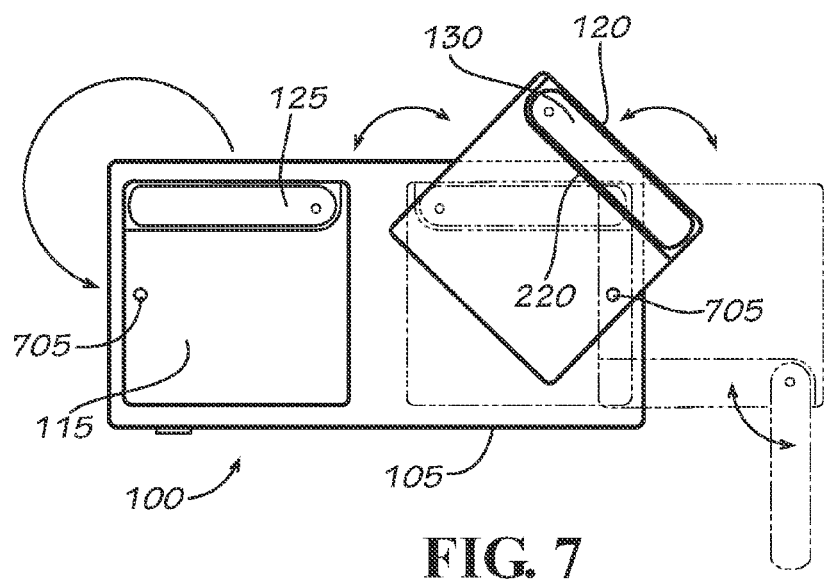
FIG. 7 is a back view of a mobile device shown with keypad halves and handles in various positions, according to an example embodiment.

FIG. 7 is a back view of a mobile device 100 shown with keypad halves 115, 120 and handles 125, 130 in various positions, according to an example embodiment. According to this embodiment, each keypad half 115, 120 is pivotably attached to the back (underneath) side of the body 105 by a pivoting mechanism 705, such as at or near the outer edges of the body 105, as shown. According to one embodiment, each pivoting mechanism 705 may be oriented at or near the center of the outer edges of the body 105, which allows the keypad halves 115, 120 to pivot about the centers of the inner edges and substantially align with the body 105 (shown by the broken line representing the second keypad half 120 in an extended configuration). It is appreciated that the keypad halves 115, 120 may be sized and shaped to permit simultaneous pivoting of each keypad half 115, 120 without interfering with the other. Moreover, the pivoting mechanism 705 may be altered to allow out of plane movement, allowing larger keypad halves 115, 120 to avoid interference with the other during simultaneous pivoting.

Figure 8:
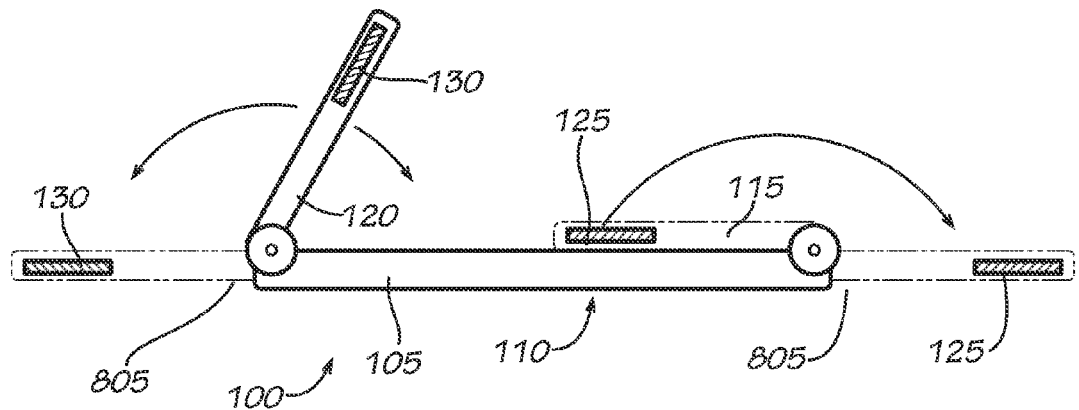
FIG. 8 is a side view of a mobile device shown with keypad halves in various positions, according to an example embodiment.

FIG. 8 is a side view of a mobile device 100 shown with keypad halves 115, 120 in various positions, according to an example embodiment. According to this embodiment, a hinge 805 is utilized to hingedly attach each keypad half 115, 120 to the edges of the body 105. In one embodiment, the keypad halves 115, 120 are configured to fold toward the back (underneath) surface of the mobile device body 105, allowing for viewing and/or use of the display 110 when the keypad halves 115, 120 are retracted. However, in another embodiment (not shown), the keypad halves 115, 120 may be configured to fold toward the front surface of the body 105, at least partially covering the display 110. This embodiment may be utilized to allow the keypad halves 115, 120 to protect the display 110 when retracted. In addition, according to one embodiment, one or both of the keypad halves 115, 120 may further include input and/or display means on the back surface, such as, but not limited to, input keys, touch screen, trackball, sensing pad, display, and the like, allowing for use of the mobile device 100 even with the keypad halves 115, 120 folded over the display 110.

Also shown, each handle 125, 130 may be slideably associated with the respective keypad half 115, 120, according to one embodiment. For example, as shown, each keypad half 115, 120 may include an interior portion having a cavity adapted to receive and hold a handle 125, 130.

Figure 9A:
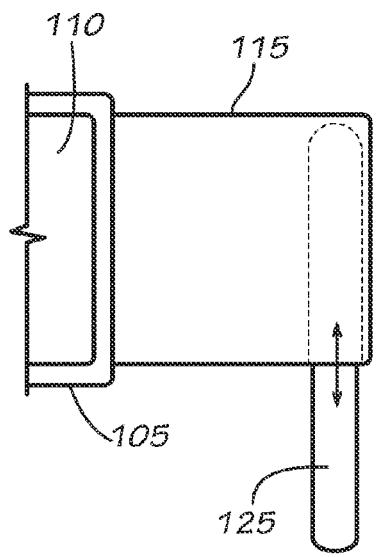
FIG. 9A is a front view of a mobile device shown with keypad halves and handles in various positions, according to an example embodiment.
Figure 9B:
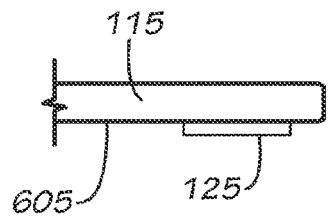
FIG. 9B is a partial side view of a keypad half and handle, according to an example embodiment.
Figure 9C:
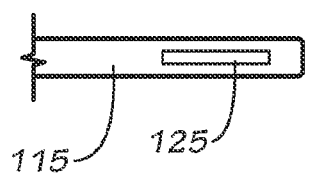
FIG. 9C is a partial side view of a keypad half and handle, according to an example embodiment.

FIGS. 9A-9C illustrate various other example embodiments by which a handle may be slideably associated with a keypad half, referring to the first handle 125 and the first keypad half 115 as an example. FIG. 9A illustrates a front view (the top side) of the first handle 125 extended from the first keypad half 115 (the broken line illustrates the first handle 125 in a retracted configuration). FIG. 9B illustrates a partial side view of the first keypad half 115 with the first handle 125 lying against the back (underneath) surface 605 of the first keypad half 115, according to one example embodiment. FIG. 9C illustrates another partial side view of the first keypad half 115 with the first handle 125 slideably contained within an interior portion or cavity of the first keypad half 115, according to another example embodiment, similar to that represented by FIG. 8.

Figure 10:
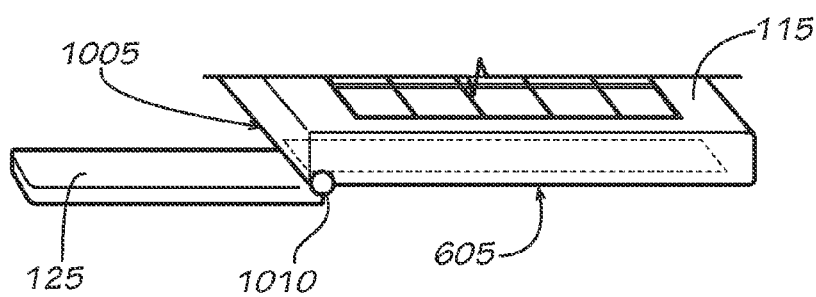
FIG. 10 is a perspective parted side view of a keypad half and handle, according to an example embodiment.

FIG. 10 illustrates a perspective partial side view of the first keypad half 115 and the first handle 125, according to another example embodiment. According to this embodiment, the first handle 125 is hingedly attached at or near the bottom edge 1005 of the keypad half 115 by a hinge 1010. Accordingly, the first handle 125 can selectively retract and extend by folding toward and away from the back surface 605 of the first keypad half 115. In one embodiment, a keypad half 115 may include a recessed portion to allow the handle 125 to lie flush or at least in a reduced profile when in a retracted configuration (shown by the broken lines).

It is appreciated that any of the extension and refraction techniques described with reference to FIGS. 1-10 may be included or combined with any of the other mobile device features described herein. Moreover, other extension and retraction apparatus may be utilized, such as, but not limited to, telescopic extension, folding extension, rolling extension, removable handles, and the like.

Figure 11:
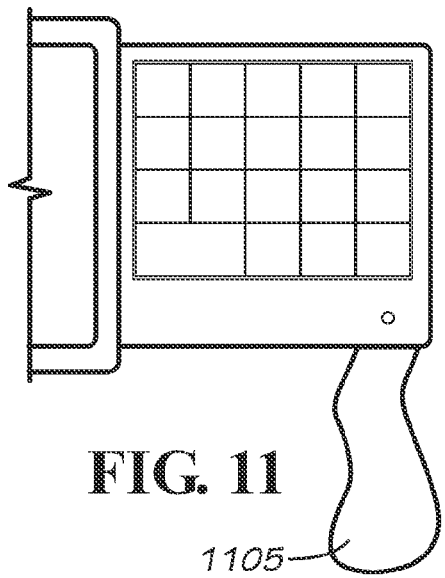
FIG. 11 is a partial front view of a mobile device, a keypad half, and a handle, according to an example embodiment.

FIG. 11 illustrates a partial front view of a mobile device 100 including a handle 1105 having an ergonomic shape. According to this embodiment, the handle 1105, and optionally any cavities, recesses, or other features of the mobile device 100 that are designed to retain or secure handles with the mobile device 100, may be shaped such as to increase the comfort and/or to improve secure grasping of the handle. For example, FIG. 2 illustrates the mobile device 100 being grasped by a user's hand, which illustrates the possible benefits of an ergonomically shaped handle 1105. It is appreciated that the ergonomic shape shown in FIG. 11 is provided for illustrative purposes, and that, according to other embodiments, an ergonomically shaped handle 1105 may have any other suitable shape.

Figure 12:
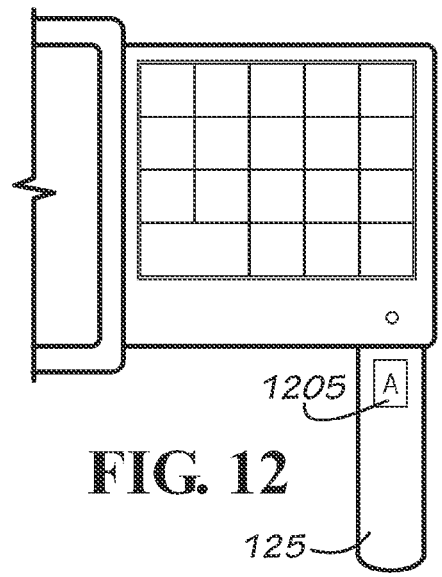
FIG. 12 is a partial front view of a mobile device, a keypad half, and a handle, according to an example embodiment.

FIG. 12 illustrates a partial front view of a mobile device 100 having a handle 125 with an input means 1205, according to an example embodiment. According to this embodiment, a handle 125 may further include one or more input means 1205 for receiving input from a user, such as, but not limited to, one or more keys, buttons, trackballs, sensing pads, knobs, sticks, and the like. The input means 1205 may be selectively programmed, such as to be assignable to perform one or more functions, depending upon the mobile device type with which it is provided, the software or application being executed, a user's preference, and the like. For example, an additional input means 1205 may be beneficial when utilizing the mobile device 100 to play video games or other interactive applications. Moreover, in some embodiments, the input means 1205 may be selectively activated, such as by being active only while the handle 125 is in an extended configuration, or only when activated by the user, the mobile device software, or other application, for example. The input means 1205 may optionally be configured to lie flush or substantially flush with the surface of the handle 125 with which it is associated, to avoid hindering extension and refraction. It is appreciated that one or more input means 1205 may be provided with any of the handle embodiments described herein.

Figure 13:
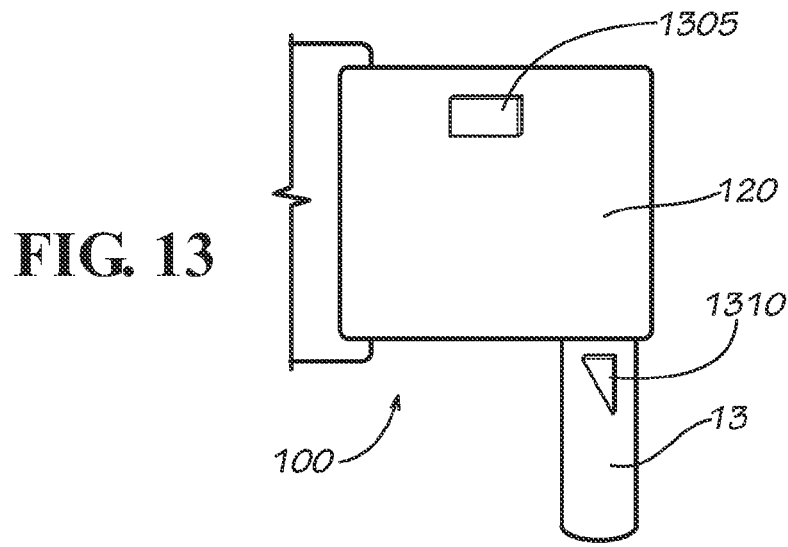
FIG. 13 is a partial back view of a mobile device, a keypad half, and a handle, according to an example embodiment.

FIG. 13 illustrates a partial back view of a mobile device 100, keypad half 120, and handle 130 having additional input means, according to an example embodiment. According to this embodiment, an input means 1305 may be provided on the underneath surface of the keypad half 120 and/or an input means 1310 may be provided on the underneath surface of the handle 130. The input means 1305, 1310 may be designed and configured in a manner similar to that described with reference to FIG. 12. It is further appreciated that, according to various other embodiments, additional input means may be associated with, and positioned on, other portions of the mobile device, such as, but not limited to, one or more edges of a keypad half, one or more edges of a handle, and the like.

Figure 14:
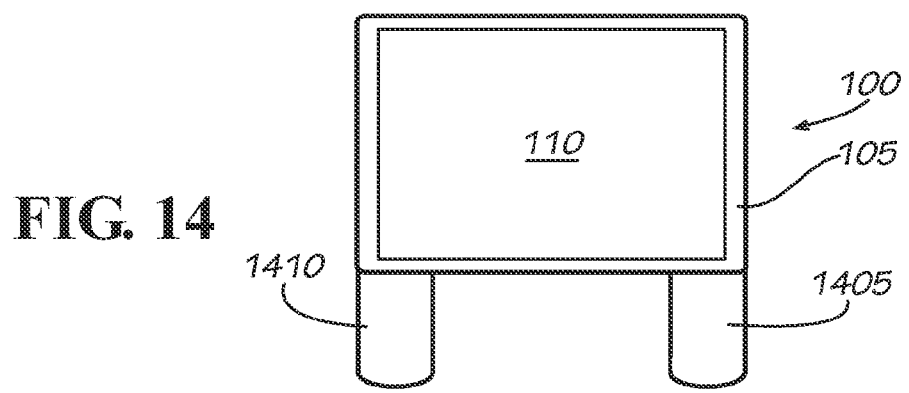
FIG. 14 is a partial front view of a mobile device and a handle, according to an example embodiment.

FIG. 14 illustrates a partial front view of a mobile device 100 having two handles 1405, 1410 adapted for selective extension and retraction from the body 105 itself, according to an example embodiment. According to this embodiment, instead of, or in addition to, having handles attached to keypad halves, handles 1405, 1410 may be provided to extend directly from the body 105 of a mobile device 100, such as may be useful to facilitate secure grasping and operation of a touch screen mobile device without sacrificing operable display size and without requiring the extension of keypad halves. The handles 1405, 1410, according to this embodiment, may be pivotably, rotatably, slideably, hingedly, and/or telescopically attached to the body 105, in a same or similar manner as described with reference to FIGS. 1-10. The mobile device body 105 may, in some embodiments, include cavities, recesses, or other adaptations to receive the handles 1405, 1410 when in a retracted configuration.

Accordingly, the embodiments described herein provide various apparatus and devices adapted to provide a split keyboard with each half having extendable and retractable handles for use with a mobile device. The split keyboard may be initially manufactured and supplied with mobile devices, or manufactured as a separate assembly and supplied as an additional or optional component to include with mobile devices. Accordingly, any of the split keyboard and handle embodiments described herein may be adapted for permanent fixation with mobile devices or for removable attachment to mobile devices.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A mobile communications device, comprising:
a body housing a display; and
a split keyboard comprising a first keypad half and a second keypad half, each of the first keypad half and the second keypad half comprising a retractable handle configured to extend from a bottom side of and in a direction away from the bottom side of the respective first keypad half or the second keypad half, wherein at least one of the retractable handles comprises at least one input means selectively programmed for receiving input commands from an operator located on a side of the at least one retractable handle that faces in a direction approximately opposite of the input keys of the respective first keypad half or the second keypad half, the input means active only when the retractable handle is extended from the respective first keypad half or the second keypad half;

wherein the first keypad half and the second keypad half are configured to separately extend and retract from the body, and wherein the first keypad half comprise a first portion of input keys and the second keypad half comprise a second portion of input keys, the first portion of input keys and the second portion of input keys together comprise a QWERTY keyboard.

2. The device of claim 1, wherein each retractable handle is pivotably attached to the respective first keypad half or the second keypad half.

3. The device of claim 1, wherein each retractable handle is slideably attached to the respective first keypad half or the second keypad half.

4. The device of claim 1, wherein each retractable handle is hingedly attached to the respective first keypad half or the second keypad half.

5. The device of claim 1, wherein, when in a retracted configuration, each retractable handle is oriented in a plane parallel to a plane occupied by the respective first keypad half or the second keypad half.

6. The device of claim 1, wherein, when in a retracted configuration, each retractable handle is slideably contained within an interior portion of a housing comprising the respective first keypad half and the second keypad half.

7. The device of claim 1, wherein each of the first keypad half and the second keypad half define a top side and the bottom side.

8. The device of claim 1, wherein each retractable handle comprises a locking mechanism operable for selectively maintaining the retractable handle in a retracted configuration or an extended configuration.

9. The device of claim 1, wherein each of the first keypad half and the second keypad half are adapted for at least one of: (a) slideable extension from the body; (b) rotatable extension from the body; (c) pivotable extension from the body; or (d) hinged extension.

10. The device of claim 1, wherein, when each of the first keypad half and the second keypad half are in a retracted configuration, each respective handle is substantially contained within the body.

11. The device of claim 1, wherein the at least one input means is located on a side of the at least one retractable handle that faces in approximately the same direction as input keys of the respective first keypad half or the second keypad half.

12. The device of claim 1, wherein the mobile device is one of: (a) a mobile telephone; (b) a personal digital assistant; (c) a personal computer; (d) a smart phone; (e) a mobile email device; or (f) a mobile digital media device.

13. The device of claim 1, wherein at least one of the first keypad half or the second keypad half comprises at least one input means for receiving input commands from an operator located on a surface that is approximately opposite of input keys.

14. The device of claim 1, wherein at least one of the first keypad half or the second keypad half is adapted for partial extension from the body, and wherein, when partially extended, the respective retractable handle is operable to selectively extend from the respective first keypad half or the second keypad half.

15. A mobile communications device, comprising:
a body housing a display;
a first retractable handle and a second retractable handle;
wherein the first retractable handle and the second retractable handle are operable to selectively extend from one or more sides of the body, and
a first keypad half and a second keypad half operable to selectively extend from approximately opposite sides of the body, wherein the first retractable handle is associated with the first keypad half and the second retractable handle is associated with the second keypad half, and wherein extending the first keypad half or the second keypad half extends the first retractable handle or the second retractable handle from a bottom side of and in a direction away from the bottom side of the respective first keypad half or the second keypad half, wherein at least one of the retractable handles comprises at least one input means selectively programmed for receiving input commands from an operator located on a side of the at least one retractable handle that faces in a direction approximately opposite of the input keys of the respective first keypad half or the second keypad half, the input means active only when the retractable handle is extended from the respective first keypad half or the second keypad half.

16. An input assembly for a mobile communications device, comprising:
a first keypad half comprising a first retractable handle selectively extendable from a bottom side of and in a direction away from the bottom side the first keypad half and
a second keypad half comprising a second retractable handle selectively extendable from a bottom side of and in a direction away from the bottom side the second keypad half
wherein,
the first keypad half and the second keypad half are adapted for attaching to a mobile device body and for selective extension and retraction, and
the first keypad half comprise a first portion of input keys and the second keypad half comprise a second portion of input keys, the first portion of input keys and the second portion of input keys together comprise a QWERTY keyboard; and
an input means selectively programmed for receiving input commands from an operator located on a side of the at least one retractable handle that faces in a direction approximately opposite of the input keys of the respective first keypad half or the second keypad half, the input means active only when the retractable handle is extended from the respective first keypad half or the second keypad half.

* * * * *